May 13, 1969     W. J. SCHRENK     3,444,031

LIGHT SCREENS AND METHOD OF MAKING THE SAME

Filed April 22, 1964

INVENTOR.
Walter J. Schrenk
BY Robert B. Ingraham
AGENT

United States Patent Office 3,444,031
Patented May 13, 1969

3,444,031
LIGHT SCREENS AND METHOD OF MAKING THE SAME
Walter J. Schrenk, Bay City, Mich., assignor to The Dow Chemical Company, Midland, Mich., a corporation of Delaware
Filed Apr. 22, 1964, Ser. No. 361,686
Int. Cl. B44f 1/04; B32b 27/30, 27/36
U.S. Cl. 161—3.5        9 Claims

ABSTRACT OF THE DISCLOSURE

A method and the resulting article of forming a light diffusing panel which includes, extruding a plurality of elongated parallel strips of an optically different synthetic thermoplastic resinous composition in a thermoplastic resinous matrix so as to encapsulate said strips.

---

The present invention relates to light screens. It more particularly is concerned with unitary light screens in the form of a thermoplastic resinous extruded sheet.

Light screens presently known to the art generally present a roughened surface on at least one side in order to induce diffusion or alternately comprise a sheet having dispersed therein sufficient pigment or similar material to provide an opaque or translucent quality. Certain diffusers have been laboriously built up employing alternate strips of translucent or transparent material. Such products are very costly and generally not readily available in a variety of shapes or sizes. Diffusing screens or sheets having dispersed therein pigment or similar particles usually have no readily controlled clear areas which permit their use as privacy screens. Screens having closely adjacent transparent and opaque areas are particularly desirable for such applications as privacy screens and the like where an observer whose eye is placed close to the screen may readily see that which is on the opposite side thereof, but to an observer at a greater distance, the screen appears translucent or opaque. Screens having one surface roughened such as in the case of glass molded into a pattern, sand blasted, or the like provides small opportunity for controlling the light passing therethrough in a particular direction.

A number of attempts have been made to prepare light screens of thermoplastic resinous material in an economic manner by co-extruding alternate layers of different colored materials or a colored material with an opaque material in side by side relationship. The general effect is pleasant, but sufficient irregularities are present in the sheet that the resultant product is oftentimes offensive to the eye because of nonuniform geometry due to the tendency of a slight smearing of one of the plastic materials into or near the adjacent stream of plastic materials. Such light screens often tend to have an almost flat surface which produces an unpleasant effect when light is reflected therefrom. Thus the product lacks the desirable uniform geometry which is obtainable in molded glass light screens or in light screens prepared by lamination of various plastic sheets and subsequent formation of the light screens by cutting strips from the edges of such sheets.

It is an object of this invention to provide an extruded thermoplastic resinous article having desirable light screening characteristics.

It is a further object of the invention to provide an extruded thermoplastic resinous composite sheet particularly adapted for use as a light screen and comprising a thermoplastic resinous matrix which is transparent to at least a portion of the visible spectrum and containing therein a plurality of parallel elements of generally different light transmitting characteristics, the transparent composition defining a light path from the first major surface of the sheet to a second major surface.

A further object of the invention is to provide an improved extrusion apparatus for the preparation of thermoplastic resinous light screens and an improved method for the preparation of such light screens.

These objects and other benefits and advantages in accordance with the present invention are readily achieved by providing a light diffusing panel comprising a thermoplastic resinous body having a first major surface and a second major surface, the first and second major surfaces being in a generally parallel arrangement, the body being composed of at least a first and a second optically different synthetic resinous thermoplastic composition, the first composition forming a continuous matrix, the second composition forming a plurality of elongated parallel strips encapsulated within the first composition, the first composition defining a path for visible light from the first major surface to the second major surface. Light screens in accordance with the present invention are readily prepared by an extrusion process wherein a plurality of parallel streams of thermoplastic resinous material are extruded into a stream of a light-transparent thermoplastic resinous material in the desired parallel relationship wherein the plurality of streams are positioned entirely within the stream of transparent material.

The method of the invention is practiced with particular advantage employing an apparatus which comprises in cooperative combination first and second housings, means to provide a first stream of heat plastified thermoplastic resinous material, means to provide a second stream of heat plastified thermoplastic resinous material, the first housing adapted to receive the first stream of thermoplastic resinous material, and discharge it as a plurality of parallel streams, the second housing being adapted to receive the second stream of heat plastified thermoplastic resinous material, and to enclose at least the discharge portion of the first housing, the discharge portion of the first and second housings being so constructed and arranged that the discharge from the second housing envelopes the discharge from the first housing, thereby providing a means to extrude a composite sheet having the plurality of streams from the first stream of heat plastified thermoplastic resinous material encapsulated within the second stream of thermoplastic resinous material.

Further features and advantages of the present invention will become more apparent from the following specification when taken in connection with the drawing wherein.

Figure 1:
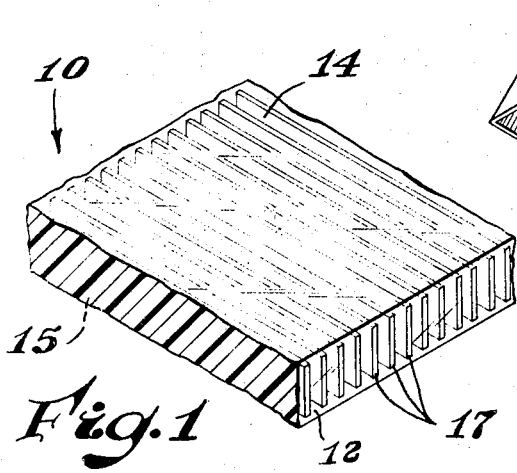
FIGURE 1 is an isometric representation of a portion of a light screen in accordance with the present invention.
Figure 2:
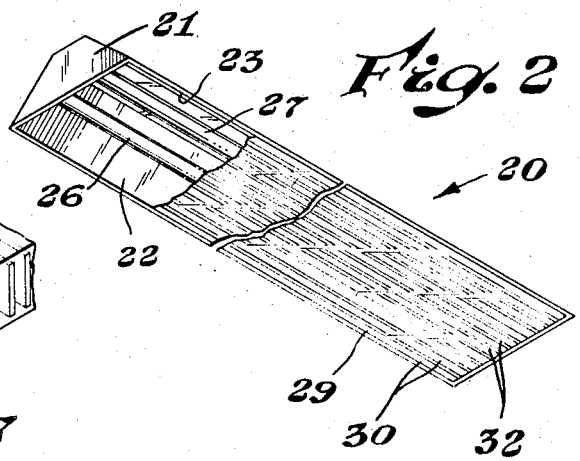
FIGURE 2 is a cutaway view of a light fixture employing a light screen of the present invention.
Figure 3:
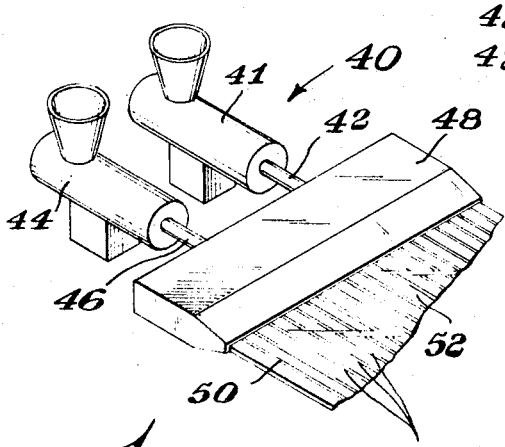
Figure 4:
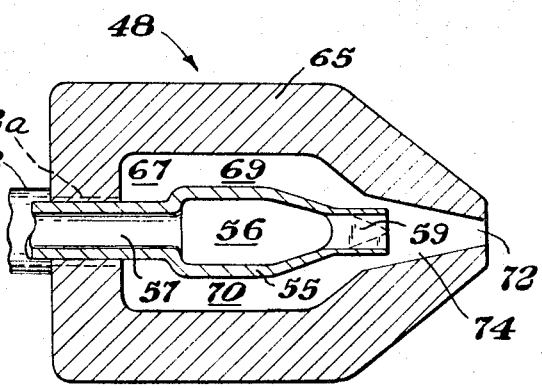

FIGURE 3 schematically represents an extrusion apparatus for the production of light screens of FIGURES 1 and 2;

FIGURE 4 is a sectional view of the die of FIGURE 3; and

Figure 5:
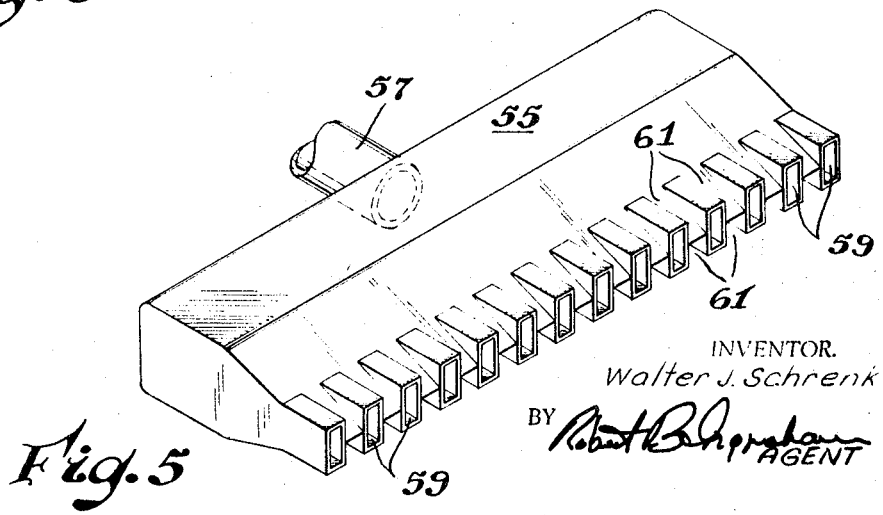

FIGURE 5 is an isometric view of a portion of the die of FIGURES 3 and 4.

In FIGURE 1 there is illustrated a portion of a light screen in accordance with the invention generally designated by the reference numeral 10. The light screen 10 comprises a body or matrix 12 of a transparent synthetic resinous thermoplastic material. The body 12 has generally opposed major surfaces 14 and 15. A plurality of elongate bodies or segments 17 of an unlike synthetic resinous material are disposed within the matrix 12 and are arranged in substantially parallel relationship to each other and to the surfaces 14 and 15.

In FIGURE 2 there is illustrated a lighting fixture 20.

The lighting fixture 20 comprises a housing 21 having reflecting surfaces 22 and 23. Within the housing 21 are disposed elongate light sources or lamps 26 and 27, such as fluorescent lamps and a light screen 29 is secured to the housing in such a manner that the emitted light must pass therethrough. The light screen 29 comprises a transparent synthetic resinous matrix 30 having disposed therein a plurality of elongate thermoplastic resinous bodies 32 substanially in the manner of the light screen 10 of FIGURE 1. The bodies 32 are of a thermoplastic resinous composittion having unlike optical characteristics to the material of the matrix 30.

FIGURE 3 schematically depicts an apparatus 40 which is particularly adapted for the preparation of light screens such as the light screen 10 of FIGURE 1 and the screen 29 of FIGURE 2. The apparatus is generally designated by the reference numeral 40 and comprises in cooperative combination a first extruder 41 for thermoplastic resinous material having a discharge 42 adapted to deliver the first stream of heat plastified thermoplastic resinous material, a second extruder 44 having a discharge 46 adapted to deliver a second stream of thermoplastic resinous material. A die 48 is in operative communication with the discharges 42 and 46 and is adapted to receive the first and second heat plastified thermoplastic resinous streams and discharge them as a single composite sheet 50 comprising a continuous transparent synthetic resinous matrix 52 formed from the material discharged from the second stream (the material discharged from the extruder 44) and having a plurality of generally elongated parallel elements 53 of unlike optical characteristics originating from the material of the first stream provided by extruder 41.

In FIGURE 4 there is illustrated a sectional view of the die 48 of FIGURE 3. With reference to FIGURES 4 and 5, FIGURE 4 provides a sectional view of the die 48 which comprises a first housing 55 which is also illustrated in FIGURE 5. The housing 55 defines therein a space 56, and an entry port 57. The entry port or conduit 57 is adapted to receive the first stream of thermoplastic resinous material delivered from the extruder 41. The housing 55 is of a generally elongate configuration and provides a plurality of discharge openings 59 disposed remote from the port 57. The openings 59 are in generally spaced parallel relationship to each other and adapted to deliver a plurality of generally parallel elongate streams of thermoplastic resinous material in spaced relationship to each other. Adjacent each of the openings 59 the housing 55 defines a plurality of second stream passages 61 so constructed and arranged that a fluid material flowing in a like direction as the discharge from the openings 59 over the housing 55 will flow together and separate the streams flowing from the openings 59. The first housing 55 is disposed within a second housing 65. The second housing 65 defines a cavity 67 which is in operative communication with a feed port 42a which is adapted to receive the discharge from an extruder such as the extruder 44. The cavity 67 is of sufficient size that passageways such as the passageways 69 and 70 defined by the adjacent portions of the housings 55 and 65 permit the flow of a fluid or heat plastified material around the housing 55 toward the discharge ports or openings 59 of the housing 55. The housing 65 defines a slot-like extrusion orifice 72 which is in full communication with a passageway 74 which in turn is in full communication with the space or cavity 67 and the cavity 56 of the first housing. Beneficially the passageway 74 constricts or narrows as it approaches the orifice 72.

Light screens in accordance with the invention are readily prepared from a wide variety of extrudable thermoplastic materials such as polystyrene, polymethyl methacrylate, polyamides, polyvinylchloride, polyvinylidene chloride copolymers, polyethylene, polypropylene, resinous copolymers of ethylene and propylene and the like.

Advantageously, the transparent portions of the sheet may contain dyes in order to permit a selected portion of the light spectrum to pass therethrough or may be water clear in order that a maximum of light will be obtained through the sheet. The second component of the sheet may be also transparent and beneficially have a refractive index difference of about 0.01 from that of the first component and advantageously about 0.05. Such a refractive index difference is sufficient usually to provide diffusion, distortion, reflection, or refraction within the sheet for the purpose intended. Thus, one or both of the components may be transparent or one of the components may be transparent and the second component opaque, translucent, reflective or light absorbing, depending on the characteristics desired. Employing well-known optical principles, sheets having almost any desired characteristics are readily prepared from extrudable thermoplastic compositions having different optical properties. For example, the sheet generally as depicted in FIGURE 1 is prepared within the segments 12 were formed of polystyrene having a thickness of about 1/8 of an inch and a width of about 3/32 of an inch having disposed between them clear polymethyl methacrylate segments, approximately 0.005 of an inch in thickness. The resultant sheet was found to be substantially transparent when viewed normally, but giving a very pleasing diffused view of the objects behind the sheet, whereas, when viewed obliquely in a plane generally normal to the striations a pleasant translucent effect was noted wherein the objects behind the screen were indistinct and no clear image was apparent. No significant loss of the total amount of light from behind the screen was observed. A similar configuration wherein the polymethyl methacrylate was replaced with white polystyrene gives a very pleasing effect, somewhat increased diffusion, and greater light loss. Replacement of the white polystyrene with a black polystyrene gives a sheet which conveniently reduces the intensity of light striking at an angle whereas the light approaching at a plane of the segments is not greatly reduced. A sheet in accordance with the invention, having dimensions substantially similar to those hereinbefore set forth was prepared from two ethyl cellulose compositions, the major segments being dyed in light yellow color and the narrower segments blue. Light passing through the sheet in a plane normal to its surface and parallel to the segments had a yellow cast, whereas light approaching from directions disposed from the plane segments takes on an increasing green color as the angle is increased.

For purposes of comparison, generally similar sheets were prepared in accordance with techniques of the prior art which employed a dual or multiple extrusion of methods such as disclosed in United States Patent 2,808,617 and British Patent 374,148, wherein no specific effort is made to truly encapsulate one of the components within the other. It is found that light diffusers prepared in this manner did not have the uniformity and clean, clear-cut appearance that is obtained utilizing the method and apparatus of the present invention. There appears to be a tendency for the different materials to smear and spread and not provide as sharp a line of demarcation between the different thermoplastic resinous compositions.

Although the segments or elongated bodies in the drawing have their major cross sectional dimension disposed in planes substantially normal to a major surface of the sheet, other configurations are readily prepared. For example, if when the openings 59 are formed, not as vertical slots, but as oblique slots, the corresponding pattern is reproduced in the extruded sheet. Thus the method and apparatus of the invention are capable of providing almost any desired configuration of segment within the transparent matrix. A plurality of parallel rods are generated by replacing an aperture 59 with two or more cylindrical openings disposed either in the plane of the sheet or in a plane normal to the sheet. Arcuate segments result when the apertures such as 59 are replaced with other apertures of the desired configuration. Thus, light screens having a wide variety of optical properties are readily prepared from heat plastifiable thermoplastic resinous materials.

What is claimed is:

1. A light diffusing panel comprising a solid thermoplastic resinous body having a first major surface and a second major surface, the first and second major surfaces being in generally parallel arrangement, the body being composed of at least a first and a second optically different synthetic thermoplastic resinous compositions, the first composition forming a continuous matrix, the second composition forming a plurality of elongated parallel strips encapsulated within the first composition, the first composition defining a path for visible light from the first major surface to the second major surface.

2. A panel in accordance with claim 1 wherein both thermoplastic compositions are transparent to light and have refractive indices differing by at least 0.01.

3. A panel in accordance with claim 2 wherein the thermoplastic resinous compositions differ in refractive indices by at least 0.05.

4. A panel in accordance with claim 3 wherein the compositions transmit light of different colors.

5. A panel in accordance with claim 1 wherein the elongated parallel strips extend the entire length of the panel.

6. The panel of claim 1 wherein the elongated parallel strips extend to a location immediately adjacent to the surfaces of the panel.

7. The panel of claim 6, wherein the distance between adjacent strips approximates one-half the thickness of the panel and the strips are spaced on centers approximating the thickness of the panel.

8. A method of preparing a light screen or panel comprising the extrusion of a plurality of parallel generally coplanar streams of a first thermoplastic resinous material into a stream of a light transparent thermoplastic resinous material in desired spaced parallel relationship wherein the plurality of parallel streams are positioned entirely within the stream of transparent material thereby forming a composite stream into a generally sheet-like configuration and cooling the composite stream below its thermoplastic temperature.

9. The method of claim 8 wherein the plurality of parallel streams are arranged to be substantially coextensive with the light transmitting streams and spaced regularly in a direction transverse to the direction of extrusion.

References Cited

UNITED STATES PATENTS

| 631,220 | 8/1899 | Manning. | |
|---|---|---|---|
| 2,258,353 | 10/1941 | Doane | 264—248 XR |
| 2,980,567 | 4/1961 | Steel. | |
| 2,174,779 | 10/1939 | Delorme | 264—75 X |
| 2,695,430 | 11/1954 | Wakefield | 161—45 |
| 3,031,351 | 4/1962 | McIlvaine | 161—6 X |

ROBERT F. BURNETT, *Primary Examiner.*

W. A. POWELL, *Assistant Examiner.*

U.S. Cl. X.R.

18—13; 161—5, 6, 18, 43, 45, 408; 156—244, 245, 500; 240—2; 264—1, 171; 350—109, 319, 320